Patented May 25, 1954

2,679,504

UNITED STATES PATENT OFFICE 2,679,504

SURFACE ACTIVE COMPOSITIONS AND METHOD OF MAKING SAME

Morris Katzman, Los Angeles, Calif., assignor to Process Chemicals Company, Los Angeles, Calif., a corporation of California No Drawing. Application March 6, 1952,
Serial No. 275,230

5 Claims. (Cl. 260—404)

This invention relates to new chemical compositions and to methods of making same by reacting alkylolamides or alkylolamide esters or mixtures thereof containing unreacted or free primary and/or secondary alkylolamines with short chain alkylating, short chain acylating or alkoxylating agents.

Heretofore, various methods have been proposed for the manufacture of condensation products from alkylolamines and alkylcarboxylic acids. For example, U. S. Reissue Patent No. 21,530 discloses the preparation of condensation products of hydroxyalkyl amines with higher molecular weight fatty acids. Illustrative examples in this patent describe condensing equal molal proportions of monoethanol or diethanolamine and others with higher fatty acids. U.S. Patent 2,089,212 discloses reacting two molal proportions of hydroxy-alkyl amine with each mol of higher molecular weight fatty acids. Still another process is described in U. S. Patent 2,429,445 wherein three molal proportions of primary or secondary alkylolamines are reacted with one molal proportion of a higher fatty acid acylating substance.

Upon physical examination of the products resulting from all the aforementioned processes, there is found in each a condensation product and free unreacted alkylolamines.

The primary object of this invention is to completely eliminate the reactivity of the primary and secondary alkylolamine by chemically changing them to the inactive form of a short chain amide or tertiary amines.

I have discovered that by adding an alkoxylation agent to any of the three types of alkylolamide condensates described in the aforementioned patents, I have been able to change both the primary or secondary free and unreacted alkylolamines to tertiary amines. For example, I may use ethylene oxide, propylene oxide, glycerol epoxide and other simliarly reactive oxides. If straight alkylation is desired, I may use such alkylation agents as short chain alkyl halides, i. e. methyl iodide, ethyl bromide, etc. I may also use such reactive alkylating agents as dimethyl sulfate, diethyl sulfate and the like. By reacting the products described in the aforementioned patents with short chain acylating agents, such as isopropenylacetate, ketene and other similar agents, desirable products are also obtained.

In order that those skilled in the art may readily and fully understand the manner in which the invention may be practiced, several specific embodiments thereof are set out hereinbelow. It will be understood that these are illustrative and are not to be construed as limitative of the full scope of the invention in any way. Thus, for example, in its broadest aspect the ratios of the reacting ingredients and the temperatures and times of reaction are subject to certain variations, within limits, without departing from the principles of the invention as set out hereinabove and in the appended claims.

*Example 1*

210 grams (1 mol) of coconut oil fatty acid and 315 grams (3 mols) of diethanolamine were mixed together. The mixture was heated for 4 to 8 hours under reduced pressure. At the completion of the condensation approximately 18 grams of water (1 mol) were lost. The reaction product consisted of 1 mol amide condensate and 2 mols free of unreacted diethanolamine.

*Example 2*

Into 126 grams of condensate described in Example 1 containing 0.5 mol free diethanolamine were introduced slowly gaseous ethylene oxide. The temperature rose from 25° to 50° C. At the end of an hour the reaction product was weighed and found to have absorbed approximately .22 grams. The product was a light amber semi-viscous liquid substantially free of diethanolamine.

*Example 3*

126 grams of condensate described in Example 1 were mixed in the cold with 29 grams of propylene oxide. The temperature rose to about 50° to 60° C. in an hour. The reaction product was substantially free of unreacted diethanolamine.

*Example 4*

126 grams of condensate described in Example 1 were mixed in the cold with 37 grams of 2,3 epoxypropanol-1. The reaction was kept on a hot water bath for 1 to 2 hours. The reaction product was substantially free of diethanolamine.

*Example 5*

6600 grams of coconut oil and 6300 grams of diethanolamine were mixed together and heated for 3 to 4 hours in an atmosphere of $CO_2$. The temperature of the reaction was kept at 150° to 160° C. The condensation was completed when the free unreacted diethanolamine content of the reaction product was 24.5%.

*Example 5A*

430 grams of the amide condensate prepared in

Example 5 and 58 grams of propylene oxide were mixed together and heated on a water bath to 35° C. The reaction was exothermic and the temperature rose to 70° C. in about 30 minutes. The reaction mass was substantially free of diethanolamine.

*Example 5B*

44 grams of ethylene oxide were absorbed in 430 grams of amide condensate prepared in Example 5. The resulting product was a viscous liquid and substantially free of diethanolamine.

*Example 5C*

430 grams of amide condensate reaction product (containing 1 mol. free diethanolamine) shown in Example 5 were reacted at 90° to 100° C. for 1 to 2 hours with 74 grams (1 mol) 2,3 epoxypropanol-1.

*Example 5D*

430 grams of amide condensate reaction product of Example 5 and 140 grams of diethylsulfate were stirred and heated on a boiling water bath for 2 to 3 hours.

*Example 5E*

430 grams of amide condensate reaction product shown in Example 5 and 102 grams of isopropenyl acetate were mixed at room temperature. The mixture was then slowly heated to refluxing temperature on a hot water bath. After 2 hours, the reaction product tested free of alkalinity.

*Example 6*

104 grams of diethanolamine (1 mol) were mixed with 200 grams of lauric acid (1 mol). The mixture was heated to 160° C. for 4 hours at which time the free fatty acid content was below 2%. The free unreacted diethanolamine was about 5% (0.14 mol). The reaction mixture was cooled down to 30° C. and 10 grams of propylene oxide were added thereto. The temperature rose to about 35° C. The mixture was then heated on a water bath for about an hour at a temperature of 90° to 95° C. The product had better oil solubility than the non-oxylated material.

*Example 7*

150 grams of isopropanolamine (2 mols) were mixed with 200 grams of lauric acid. The mixture was heated to 160° C. for about 4 hours. The free fatty acid content of this reaction product was below 1%. The reaction product consisted of 1 mol of isopropanol lauramide and 1 mol of free unreacted isopropanolamine.

*Example 8*

116 grams of propylene oxide was added to the reaction product shown in Example 7 at 25° C. The mixture was well stirred and allowed to stand without heating. In about an hour the temperature rose to 70° C. The reaction mixture was then heated to 100° C. for about 30 minutes with no loss in weight, indicating that all the propylene oxide had reacted. The reaction product was substantially free of monoisopropanolamine.

*Example 9*

1 mol of coconut fatty acid (210 grams) and 2 mols of diisopropanolamine (150 grams) were mixed and heated for 3 to 4 hours at 160° C. until the free fatty acid was less than 2%. The reaction product was cooled to 30° C. and one mol of propylene oxide was added thereto. The reaction mass was then heated slowly to 80° to 90° C. for 1 hour at which time substantially no free unreacted diisopropanolamine was found in the final product.

In Examples 1, 5, 6, 7 and 9 methods are described for preparing alkylolamide condensates which contain free and unreacted primary and secondary alkylolamines. These methods are well-known to those skilled in the art. The alkylolamide condensates are articles of commerce; but in order to clarify the various types and kinds of alkylolamide condensates that can be used in accordance with my present invention, I herewith give in detail a group of primary and secondary alkylolamines and a group of acyl reacting substances.

Among the hydroxy alkylamine (primary and secondary) which may be used in the preparation of the alkylolamide condensates are, for example, symmetrical, unsymmetrical, normal and isoderivatives, such as monoethanolamine, diethanolamine, dipropanolamine, monopropanolamine, monobutanolamine, monoisobutanolamine, monopentanolamine, dibutanolamine, mono- and di-pentanolamine, mono- and di-hexanolamine, mono- and di-octanolamine, mono- and di-decylolamine, mono-laurylolamine, mono - hexa - decylolamine, mono - octadecylolamine, mono-ethyl ethanolamine, diethylaminoethanol, monobutyl ethanolamine; arylolamines and cyclic hydroxy amines such as cyclohexyl ethanolamine, N - cyclohexyl butanolamines, ethanolaniline, ethyl phenyl ethanolamine, 2-methylamino-propandiol-1,3; 1 - phenyl - amino-propan-diol-2,3; 1-hydroxy-ethylamino-2, methoxy-propan-ol-3; 2 - N - methylamino-propandiol - 1,3; monoethanol monopropanolamine, monoethanol monobutanolamine; alkylol polyamines such as alkylol derivatives of ethylene diamine, diethylene triamine, and tri-ethylene tetra-amine as, for example, hydroxy, ethyl ethylene diamine; diglycerol monoamine, diglycerol-di-amine; hydroxy-alkyl amines derived from other polyhydric alcohols, including glycols, sugars and sugar alcohols such as ethylene glycol, diethylene glycol, dextrose, sucrose, sorbitol, mannitol and dulcitol.

The acyl segment of the alkylolamide condensates of the alkylolamine enumerated above may also be selected from a large group and may be derived from straight chain and branched chain, saturated and unsaturated, carboxylic, aliphatic (including cycloaliphatic), fatty, aromatic, hydroaromatic, and araliphatic acids including butyric acid, caproic acid, pimelic acid, enanthic acid, caprylic acid, pelargonic acid, capric acid, sebacic acid, behenic acid, arachidic acid, cerotic acid, erucic acid, melissic acid, stearic acid, oleic acid, ricinoleic acid, ricinelaidic acid, ricinosteaolic acid, linoleic acid, linolenic acid, lauric acid, myristic acid, palmitic acid, mixtures of any two or more of the above-mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil, and other fish oils, partially or completely hydrogenated animal and vegetable oils such as those mentioned; oxidized hydroxy and alpha-hydroxy higher carboxylic, aliphatic and fatty and/or polymerized higher fatty acids or higher fatty acids derived from oxidized and/or polymerized triglyceride oils; acids such as di-hydroxy-stearic acid, dihydroxypalmitic acid, di-hydroxy-stearic acid, dihydroxybehenic acid, alpha-hydroxy capric acid, alpha-hydroxy stearic acid, alpha-hydroxy palmitic acid, alpha-hydroxy lauric acid, alpha-hydroxy myristic acid, alpha-hydroxy coconut oil mixed fatty acids, alpha-hydroxy margaric acid, alpha-hydroxy arachidic acid, and the like; fatty and similar acids derived from various waxes such as beeswax, spermaceti, montan wax, coccerin, and carnauba wax and higher molecular weight carboxylic acids derived by oxidation and other methods, from paraffin wax, petroleum and similar hydrocarbons; resinic and hydroaromatic acids such as hexahydrobenzoic acid, naphthenic acid and abietic acid, araliphatic and aromatic acids such as phthalic acid, benzoic acid, naphthoic acid, and the like.

The products of the present invention may be employed alone or together with lesser or greater quantities of inorganic or organic compounds. Thus, for example, they may be employed together with salts such as sodium chloride, alkali metal phosphates including pyrophosphates and tetraphosphates, sodium sulphate, alums, perborates, such as sodium perborate, and the like. They may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophilic gums including pectin, tragacanth, karaya, locust bean, gelatin, arabic and the like, glue; vegetable, animal, fish and mineral oils; solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alkyl sulphates, phosphates, pyrophosphates, and tetraphosphates, as, for example, lauryl sodium tetraphosphate, octyl sodium sulphate, oleyl sodium sulphate, and the like; higher fatty acid partial esters of aliphatic polyhydroxy substances such as monoglycerides, diglycerides and partial esters of polyglycerols, for example, mono-caprylin, mono-laurin, mono-olein, diolein, oleic and stearic acid mono-esters of polyglycerols; higher fatty acid mono-esters of glycols, such as lauric acid mono-ester of diethylene glycol; higher molecular weight sulphonic acid derivatives such as cetyl sodium sulphonate and lauryl sodium sulphonate, alkyl benzene sodium sulfonate, sulpho-carboxylic acid esters of higher molecular weight alcohols such as lauryl sodium sulphoacetate, di-octyl sodium sulpho-succinate, dilauryl potassium sulpho-glutarate, lauryl mono-ethanolamine sulphoacetate, and the like; sulphuric and sulphonic derivatives of condensation products of alkylolamines and higher fatty acids; phosphoric, pyrophosphoric and tetraphosphoric acid esters of higher molceular weight alcohols; Turkey-red oils, compounds of the type of isopropyl naphthalene sodium sulphonate, and other classes of wetting agents.

Among the various alkoxylating agents the preferred agents are ethylene oxide, propylene oxide, 1,3-epoxypropane, 2,3-epoxy-1-hydroxypropane, epichlorohydrin, etc. The important alkylating agents may be selected from the following agents: alkyl sulfates, such as dimethyl sulfate, diethyl sulfate; alkyl azoimides such as methyl azoimide and ethyl azoimide; alkyl halides such as methyl bromide, methyl chloride, ethyl iodide, propyl bromide, lauryl bromide, octyl chloride, octydecyl bromide and others. The short chain acylating agents may be selected from diverse groups such as methyl formate, methyl acetate, isopropenyl acetate, ketene, short chain fatty acids, such as formic acid, acetic acid, propionic, and butyric and lactic acid, hydrogen acetic acid and other fatty acids, and their anhydrides of 5 carbon atoms or less. I may also use benzoic acid, phthalic acid and its anhydride.

While the invention has been described in detail, it is to be understood that the scope thereof is not to be limited other than is set forth in the claims.

I claim:

1. The method of preparing reaction products having interface surface activity which comprises the steps of reacting an alkylolamine having at least one replaceable hydrogen attached to the nitrogen with a long chain acylating agent to produce a mixture containing a free unreacted alkylolamine having at least one replaceable hydrogen attached to the nitrogen and a condensation product of a long chain acylating agent and an alkylolamine, then reacting said mixture with a hydrogen replacing agent for said replaceable hydrogen of said unreacted alkylolamine, said agent being selected from the group consisting of an alkoxylating agent, an alkylating agent and a short chain acylating agent, the amount of said hydrogen replacing agent being sufficient to react only with the amino hydrogen of the free unreacted alkylolamine.

2. The method of preparing reaction products having interface surface activity which comprises the steps of reacting an alkylolamine having at least one replaceable hydrogen attached to the nitrogen with a long chain acylating agent to produce a mixture containing a free unreacted alkylolamine having at least one replaceable hydrogen attached to the nitrogen and a condensation product of a long chain acylating agent and an alkylolamine, then reacting said mixture with an alkyl sulfate in sufficient amount to react only with the amino hydrogen of said free unreacted alkylolamine.

3. The method of preparing reaction products having interface surface activity which comprises the steps of reacting an alkylolamine having at least one replaceable hydrogen attached to the nitrogen with a long chain acylating agent to produce a mixture containing free alkylolamine and the condensation product of alkylolamine having at least one replaceable hydrogen attached to the nitrogen and a long chain acylating agent selected from the group consisting of higher fatty acids, then reacting said mixture with an acylating agent selected from the group consisting of alkyl esters of carboxylic acids having 1 to 5 carbon atoms in amount sufficient to react only with the amino hydrogen of the free unreacted alkylolamine.

4. The method of preparing reaction products having interface surface activity which comprises the steps of reacting an alkylolamine having at least one replaceable hydrogen attached to the nitrogen with a long chain acylating agent to produce a mixture containing a free unreacted alkylolamine having at least one replaceable hydrogen attached to the nitrogen and a condensation product of a long chain acylating agent and an alkylolamine, then reacting said mixture with ketene in amount sufficient to react only with the amino hydrogen of the free unreacted alkylolamine.

5. The method of preparing reaction products having interface surface activity which comprises the steps of reacting an alkylolamine having at least one replaceable hydrogen attached to the nitrogen with a long chain acylating agent to produce a mixture containing a free unreacted alkylolamine having at least one replaceable hydrogen attached to the nitrogen and a condensation product of a long chain acylating agent and an alkylolamine, then reacting said mixture with isopropenyl acetate in amount sufficient to react only with the amino hydrogen of t acted alkylolamine.

References Cited in the file of
UNITED STATES PATE

| Number | Name |
|---|---|
| 2,085,706 | Schoeller et al. |
| 2,425,392 | Robinson et al. |
| 2,429,445 | Young et al. |
| 2,520,381 | Carnes |
| 2,602,087 | De Groote |